3,819,832
ANTIVIRAL AGENT FWH-775 AND METHOD OF PRODUCTION

Narendra N. Joshi, 345 Gratton St.,
Montreal 378, Quebec, Canada
No Drawing. Continuation-in-part of application Ser. No. 64,025, July 20, 1970, which is a continuation of application Ser. No. 616,159, Feb. 15, 1967, which in turn is a continuation of application Ser. No. 547,167, May 3, 1966, all now abandoned. This application May 2, 1972, Ser. No. 249,504
Int. Cl. A61k 21/00
U.S. Cl. 424—115                                 5 Claims

ABSTRACT OF THE DISCLOSURE

The present invention relates to a new antiviral substance. More particularly, the present invention relates to a new antiviral substance obtained from a fermentation process utilizing a novel microorganism of the species *Aspergillus niger*. The antiviral substance has been found to be effective against both DNA and RNA viruses in laboratory animals.

---

This application is a continuation-in-part of Application Ser. No. 64,025, filed July 20, 1970, now abandoned, which, in turn was a continuation application of Application Ser. No. 616,159 filed Feb. 15, 1967, now abandoned, which, in turn was a continuation application of Application Ser. No. 547,167 filed May 3, 1966, now abandoned.

The present invention relates to a new antiviral substance which is obtained by cultivating a new fungus which morphological studies have determined is of the *Aspergillus niger* species and has the following characteristics: distinct thick walled and single celled foot cell: septate mycelium: globose, smooth, thick walled vesicle: primary and secondary strigmata and a round conidia. The organism was isolated from swine embryo kidney tissue cultures infected with Batts V 13, a swine entero virus. A culture of the living organism has been deposited in the American Type Culture Collection, 12301 Parklawn Drive, Rockville, Md., U.S.A., 20852 and assigned ATTC No. 16508 pursuant to the terms of contract No. 474 between Frank W. Horner, Limited assignee of the instant application and the American Type Culture Collection.

The active antiviral substance of the present invention believed to be an amino acid derivative of low molecular weight, hereinafter designated as FWH-775, is obtained by cultivating ATTC No. 16508 under aerobic conditions in an aqueous culture medium preferably at temperatures ranging from about 20° to about 40° C. The antiviral substance is found in the fermentation broth in minor amounts. Inasmuch as the substance of the present invention is extremely active against viruses at very low concentrations, the fermentation broth itself can be conveniently used as a dilute solution for administration of the active substance which eliminates the problem of cumbersome separation and purification steps.

Fermentation broths containing FWH-775 are produced by inoculating spores of ATTC No. 16508 into a suitable medium and then cultivating under aerobic conditions. It has been established that 50 percent less activity results in the FTC broth when fermented under anaerobic conditions rather than aerobic. FTC activity in the broth is not increased by increasing the glucose concentration in the medium beyond 1–2 milligrams/mgml. As a concentration of glucose is increased, the final pH of the medium decreases and the activity in the broth is accordingly reduced. Agitated culture after 48 hours incubation has identical activity as that incubated for 6 days without agitation. Eleven media containing various amino acids were fermented (Table 2) and the results *in bivo* activity indicate that glutamic acid and phenylalanine are essential for antiviral activity.

The nature of the culture medium does not appear to be critcial. A suitable culture medium consists of Hanks balanced salt solution enriched with 0.5 percent lactalbumin hydrolysate (enzymatic) and 0.1 percent yeastolate.

The temperature of the cultivation may be varied over a wide range of from about 20° C. to about 40° C. At temperatures below about 20° C. the growth rate of the microorganism is extremely slow whereas at temperatures above 40° C. the biosynthetic activity of the microorganism is reduced. A cultivation temperature of about 37° C. is preferred.

The time of cultivation is dependent on various factors such as temperature, method of incubation and the like, and can be varied over wide limits. When the cultivation is carried out by stationary incubation at the preferred temperature of 37° C., a cultviation time of from 6 to 15 days gives optimum results. On the other hand, if the cultivation takes place at the same temperature under agitated conditions, suitable results can be obtained in substantially shorter periods of from 2 to 4 days.

The fermentation is carried out at a substantially neutral pH, for example, pH 6.0–8.0 and preferably at a pH of 6.5–7.0. It has been found that in general, depending on the characteristics on the culture medium used, the pH value changes substantially as the fermentation proceeds. For example, when the fermentation is carried out on the enriched Hanks balanced salt solution described above, the initial pH is about 6.4–6.5. When said fermentation is allowed to go to completion of pH is generally about 8.3–8.5.

The growth characteristics of the microorganism are set forth in Tables 1–3 which follows. Additionally, the changes in pH in the various fermentation broths are set forth in Table 4 which follows.

TABLE I

Growth characteristics of *Aspergillus niger* var. *Joshi* 16508 at 37° C. on solid media

| | 24 hours | 48 hours | 72 hours | 96 hours | 168 hours |
|---|---|---|---|---|---|
| Medium—Sabouraud dextrose agar: | | | | | |
| Growth | Slight-moderate | Good | Good | Good | Good. |
| Fruiting | No fruiting | Moderate | do | do | Good-abundant. |
| Color of fruiting | | Greenish (black) | Black (greenish) | Black (greenish) | Black (greenish). |
| Color on reverse | | Slightly yellowish | Slightly yellowing (near margins). | Yellowish/greyish tint. | Greyish/yellow. |
| Arrangement of fruiting | | | Concentric fruiting | Concentric fruiting | Concentric fruiting. |
| Medium—Czapekdox agar: | | | | | |
| Growth | Slight | Moderate | Moderate-good | Good | Good-abundant. |
| Fruiting | | do | Moderate | do | Abundant. |
| Color of fruiting | | Black (greenish) | Black | Black | Black. |
| Color on reverse | | Colorless | Slightly yellowish/ near margin. | Yellow reverse | Yellow reverse. |
| Arrangement of fruiting | | | | | |

TABLE I—Continued

| | 24 hours | 48 hours | 72 hours | 96 hours | 168 hours |
|---|---|---|---|---|---|
| Medium—Nutrient agar: | | | | | |
| Growth | Slight | Slight | Slight-moderate | Moderate | Moderate. |
| Fruiting | | | Slight fruiting | Moderate fruiting | Do. |
| Color of fruiting | | | Greenish black | Black (greenish) | Black. |
| Color on reverse | | Colorless | Light greyish yellow | Greyish (yellow tint) | Greyish yellow. |
| Arrangement of fruiting | | | | | |
| Medium—Potato dextrose agar: | | | | | |
| Growth | Slight | Moderate | Moderate-good | Good | Good. |
| Fruiting | | Slight | Moderate | do | Do. |
| Color | | Black (greenish) | Black | Black | Black. |
| Color on reverse | | Greyish white | Grey | Grey (yellowish) | Yellowish grey. |
| Arrangement of fruiting | | | Concentric | Concentric | Concentric. |
| Medium—Malt extract agar: | | | | | |
| Growth | Moderate-good | Abundant | Abundant | Abundant | Abundant. |
| Fruiting | Moderate | do | do | do | Do. |
| Color of fruiting | Black (greenish) | Black | Black | Black | Black. |
| Color on reverse | Yellowish | Distinct yellow | Strongly yellow | Strongly yellow | Deep yellow. |
| Arrangement of fruiting | | | | | |
| Medium—Sabouraud maltose agar: | | | | | |
| Growth | Slight-moderate | Moderate | Moderate | Moderate | Moderate. |
| Fruiting | | Slight | do | Good-abundant | Abundant. |
| Color of fruiting | | Greenish black | Black (greenish) | Black | Black. |
| Color on reverse | | Yellowish | Yellowish | Yellow | Yellow (margins greenish.) |
| Arrangement of fruiting | | | | | |

TABLE II

Growth characteristics of *Aspergillus niger* var. *Joshi* 16508 at room temperature (21° C.) on solid media

| | 24 hours | 48 hours | 72 hours | 96 hours | 168 hours |
|---|---|---|---|---|---|
| Medium—Sabouraud dextrose agar: | | | | | |
| Growth | | | Slight-moderate | Moderate | Moderate. |
| Fruiting | | | Slight | do | Do. |
| Color of fruiting | | | Greenish (black) | Black | Black. |
| Color on reverse | | | Yellow/yellow tint around fruiting in front. | Yellow/yellow tint around fruiting in front. | Yellow. |
| Arrangement of fruiting | | | | Concentric | Concentric. |
| Medium—Czapekdox agar: | | | | | |
| Growth | | | Slight | Slight-moderate | Moderate. |
| Fruiting | | | | Poor-slight | Slight-moderate. |
| Color of fruiting | | | | Black (greenish) | Black (greenish). |
| Color on reverse | | | | Distinct yellow/ yellow around fruiting in front. | Distinct yellow/ yellow around fruiting in front. |
| Arrangement of fruiting | | | | | |
| Medium—Nutrient agar: | | | | | |
| Growth | | | Slight | Slight-moderate | Moderate. |
| Fruiting | | | Poor | Poor-slight | Do. |
| Color of fruiting | | | Black (greenish) | Black | Black. |
| Color on reverse | | | | | Slight yellowish. |
| Arrangement of fruiting | | | | | |
| Medium—Potato dextrose agar: | | | | | |
| Growth | | | Slight-moderate | Slight-moderate | Moderate. |
| Fruiting | | | Slight | Moderate | Do. |
| Color of fruiting | | | Greenish (black) | Black | Black. |
| Color on reverse | | | Yellowish/with yellow tint around fruiting in front. | Greyish yellow/ with yellow tint around fruiting in front. | Yellow (greyish). |
| Arrangement of fruiting | | | | | |
| Medium—Malt extract agar: | | | | | |
| Growth | | Slight-moderate | Good | Abundant | Abundant. |
| Fruiting | | Moderate | Good-abundant | do | Do. |
| Color of fruiting | | Black (greenish) | Black | Black | Black. |
| Color on reverse | | Yellow | Distinct yellow/ yellow tint around fruiting area in front. | Distinct yellow/ yellow tint around fruiting area in front. | Distinct deep yellow. |
| Arrangement of fruiting | | | | | |
| Medium—Sabouraud Maltose agar: | | | | | |
| Growth | | | Slight | Moderate | Moderate. |
| Fruiting | | | | Slight-moderate | Do. |
| Color of fruiting | | | | Black (green) | Black. |
| Color on reverse | | | | Yellow/yellow tint around the fruiting area in front. | Yellow/yellow tint around the fruiting area in front. |
| Arrangement of fruiting | | | | | |

TABLE III

Growth characteristics of *Aspergillus niger* var. *Joshi* 16508 at 37° C. in liquid media

| | 24 hours | 96 hours | 192 hours |
|---|---|---|---|
| Medium—Czapekdox broth: | | | |
| Growth as a whole | Moderate growth | Moderate growth | Abundant growth. |
| Surface growth | Surface/moderate | Surface/moderate | Surface/moderate. |
| Submerged growth | Submerged/nill | Submerged/nill | Submerged/nill. |
| Fruiting | Fruiting slight | Fruiting moderate | Fruiting abundant. |
| Fruiting color | Fruiting black | Fruiting black | Fruiting black. |
| Changes in the medium color | No change in medium color | No change in medium color | No change in medium color. |
| Medium—Nutrient broth: | | | |
| Growth as a whole | Poor growth | Poor-moderate growth | Moderate growth. |
| Surface growth | Surface growth | Surface growth | Surface growth. |
| Submerged growth | Submerged/nill | Submerged/nill | Submerged/nill. |
| Fruiting | Fruiting poor | Fruiting slight-moderate | Fruiting moderate. |
| Fruiting color | Fruiting black | Fruiting black | Fruiting black. |
| Changes in the medium color | No change in medium color | No change in medium color | Medium darker. |

TABLE III—Continued

| | 24 hours | 96 hours | 192 hours |
|---|---|---|---|
| Medium—Heart infusion broth: | | | |
| Growth as a whole | Abundant growth | Abundant growth | Abundant growth. |
| Surface growth | Surface growth | Surface growth | Surface growth. |
| Submerged growth | Submerged/nill | Submerged/nill | Submerged/nill. |
| Fruiting | Fruiting poor | Fruiting moderate-slight | Fruiting abundant. |
| Fruiting color | Dark brown fruiting | Black fruiting | Black fruiting. |
| Changes on the medium color | No change in medium color | No change in medium color | Medium darker. |
| Medium—Submerged maltose broth: | | | |
| Growth as a whole | Moderate growth | Good growth | Good growth. |
| Surface growth | Surface growth | Surface growth | Surface growth. |
| Submerged growth | | Submerged/slight | Submerged/slight. |
| Fruiting | Fruiting moderate | Fruiting abundant | Fruiting abundant. |
| Fruiting color | Black | Black | Black. |
| Changes in the medium color | No change in medium color | No change in medium color | No change in medium color. |
| Medium—Sabouraud dextrose broth: | | | |
| Growth as a whole | Moderate growth | Moderate growth | Good growth. |
| Surface growth | Surface growth | Surface growth | Surface growth. |
| Submerged growth | Submerged/slight | Submerged/moderate | Submerged/moderate. |
| Fruiting | Fruiting near periphery | Fruiting moderate | Fruiting good. |
| Fruiting color | Black | Black | Black. |
| Changes in the medium color | No change in medium color/only a yellow surface ring. | No change in medium color/slight yellow surface ring. | Medium light/yellowish tint. |

TABLE IV.—pH CHANGES

Growth of *Aspergillus niger* var. *Joshi* 16508 at 37° C. in broth

| Medium | Starting pH | pH after 192 hours |
|---|---|---|
| Nutrient broth | 7.5 | 8.9 |
| Heart infusion broth | 7.9 | 8.3 |
| Sabouraud dextrose broth | 6.8 | 3.8 |
| Sabouraud maltose broth | 7.7 | 3.3 |
| Czapekdox broth | 8.0 | 3.2 |

After many attempts to isolate the antiviral active components from the crude broth were made by means of solvent extraction of the crude broth or the freeze-dried broth with a series of solvents including ethylacetate, benzene, ether and chloroform at acidic neutral and basic pH, it was determined that in all cases, activity remained in the water layers. It appeared that the active components are polar water soluble substances, probably low molecular weight amino acid derivatives.

It was observed that at pH 7.6 activity was not destroyed upon heating at 60° C. for 3 hours, whereas all activity was lost at pH 1 with such a treatment. In order to obtain samples for testing the antiviral activity of FWH-775 in laboratory animals, the broths were pooled and freeze-dried to yield an off-white solid which consists of major amounts of inorganic salts of the culture medium and minor amounts of FWH-775.

The present antiviral substance is substantially stable at a pH in the range of 1-10 and is substantially heat stable. For example, the antiviral activity of broth samples containing FWH-775 and having a pH in the range of 7.0-8.5 remains substantially unchanged after heating said samples to 100° C. for a period of 10 minutes.

A typical method of carrying out the process of the present invention by stationary incubation is described below:

Twelve one-liter flasks were each charged with about 400 ml. of enriched Hanks' salt solution, inoculated with an aqueous spore suspension of the organism and stoppered with loose cotton plugs.

The composition of the medium used is set forth below. The figures indicate grams of the particular component per liter of distilled water.

| | |
|---|---|
| Sodium chloride | 8.00 |
| Potassium chloride | 0.40 |
| Calcium chloride | 0.14 |
| Magnesium sulfate | 0.10 |
| Magnesium chloride | 0.10 |
| Disodium phosphate | 0.06 |
| Monopotassium phosphate | 0.06 |
| Dextrose | 1.00 |
| Phenol red | 0.02 |
| Lactalbumin hydrolysate (enzymatic) | 5.00 |
| Yeastolate | 1.00 |

After eight days of stationary incubation at 37° C., the surface mycelium was removed from each flask and discarded and the culture broths were filtered through a millipore filter (0.45) and pooled.

Freeze drying of a sample of the pooled broths yields an off-white solid, in an amount of about 13 milligrams per milliliter of liquid. Said solid consists of major amounts of inorganic salts from the culture medium and minor amounts of FWH-775.

A typical method of carrying out the process of the invention under agitated conditions is set forth hereinbelow:

Twelve 500-ml. flasks were each charged with about 200 ml. of enriched Hanks' salts solution, having the composition set forth hereinbefore, inoculated with an aqueous spore suspension of the organism and stoppered with loose cotton plugs.

The flasks were placed on a reciprocal shaker, set to operate at about 120 cycles per minute, and incubated for a period of three days at 37° C. under continuous agitation.

After three days, the mycelium which had formed was removed and discarded and the culture broths were filtered through a millipore filter (0.45) and pooled.

Freeze drying of a sample of the pooled broths, which are substantially lighter than broths obtained by the stationary incubation method, yields a white solid, in an amount of about 13 milligrams per milliliters of liquid. As in the previous example, said solid consists of minor amounts of FWH-775 admixed with major amounts of inorganic salts from the culture medium.

The antiviral activity of the culture broths was tested in various laboratory animals.

PROTECTIVE EFFECT OF FWH-775 ON RABBITS INFECTED WITH VACCINIA VIRUS

Six rabbits, averaging about 2.5 kg. in body weight were used in these experiments. Three rabbits were each daily administered intravenously with 2.0 ml. of the culture broth containing FWH-775 for five days and were then infected with vaccinia virus by the scarification of the cornea of the left eye (the right eye served as an internal control) and by intradermal inoculations at four points on the back. Each inoculum consisted of approximately $10^5$ $ID_{50}$ of tissue culture-propagated vaccinia virus, a DNA virus. Following infection, the administration of the active culture broth was continued for four days.

Three rabbits which served as controls received, instead of the active broth similar amounts of enriched Hanks' salt solution. The results set forth in Table V indicate that the rabbits treated with the active culture broth containing FHW-775 were completely protected against infection, whereas the control rabbits showed typical eye and skin lesions caused by the virus.

TABLE V

| Day | Rabbits treated with active broth | Control rabbits |
|---|---|---|
| 1 | − | − |
| 2 | − | − |
| 3 | − | − |
| 4 | − | − |
| 5 | − | − |
| 6 | − | − |
| 7 | −* | −* |
| 8 | − | − |
| 9 | − | − |
| 10 | − | + |
| 11 | − | ++ |
| 12 | − | +++ |
| 13 | − | +++ |

NOTE: *=Infected with vacinia virus; −=No reaction, +=Lesions caused by vacinia virus.

The above experiment was repeated substantially as described. The only difference is that in one test (Table VI), the administration of the active broth was commenced three days prior to infection, and in the other test (Table VII), the administration of the active broth was commenced simultaneously with the infection. In both tests, the administration of the active broth was continued until the twelfth day at a daily dosage of 2.0 ml. per animal. In both tests, the treated animals were completely protected.

TABLE VI

| Day | Rabbits treated with active broth | Control rabbits |
|---|---|---|
| 1 | − | − |
| 2 | − | − |
| 3 | − | − |
| 4 | −* | −* |
| 5 | − | − |
| 6 | − | − |
| 7 | − | − |
| 8 | − | − |
| 9 | − | + |
| 10 | − | ++ |
| 11 | − | ++ |
| 12 | − | ++ |

NOTE.—See footnote bottom of Table V.

TABLE VII

| Day | Rabbits treated with active broth | Control rabbits |
|---|---|---|
| 1 | − | − |
| 2 | − | − |
| 3 | − | − |
| 4 | −* | −* |
| 5 | − | − |
| 6 | − | − |
| 7 | − | − |
| 8 | − | − |
| 9 | − | + |
| 10 | − | ++ |
| 11 | − | ++ |
| 12 | − | ++ |

NOTE.—See footnote bottom of Table V.

In order to demonstrate the protective action of FWH-775 in post-infection administration, five groups of rabbits were infected with vaccinia virus as described above. Each group consisted of three rabbits. Group A received the first dose of active broth (2.0 ml. per animal) 24 hours after infection, Group B 16 hours, Group C 6 hours and Group D at the same time as infection. Group E served as the control.

The administration of the active broth to the test animal was continued until the ninth day at a daily dosage of 2.0 ml. per animal.

As indicated in Table VIII, which follows, FWH-775 protected the infected animals even when administered 24 hours post-infection.

TABLE VIII

| Day | Group of— A | B | C | D | E |
|---|---|---|---|---|---|
| 1 | − | − | − | − | − |
| 2 | − | − | − | − | − |
| 3 | − | − | − | − | − |
| 4 | − | − | − | − | − |
| 5 | − | − | − | − | − |
| 6 | − | − | − | − | ++ |
| 7 | − | − | − | − | +++ |
| 8 | − | − | − | − | +++ |
| 9 | − | − | − | − | +++ |

NOTE.—See footnote bottom of Table V.

The protective effect of FWH-775 against influenza virus, a RNA virus, in mice was also demonstrated.

Mice, averaging 15 grams in body weight, were infected with a mouse-adapted PR-8 strain of influenza A virus. A 10 percent suspension of infected mouse lung containing approximately $10^{5.5}$ $ID_{50}$ was administered to each animal.

Group A received a daily dosage of 0.5 ml. of active broth intraperitoneally beginning three days before infection, Group B beginning two days before infection, Group C beginning one day before infection and Group D at the same time as infection. Group E served as virus control. The administration of the active broth was continued for seven days after infection, at which time the animals were observed. The results are set forth in Table IX, in terms of number of mice dead over number of total mice used in each experiment. A mouse was classified as sick when it exhibited a rough hair coat, a loss of weight and inactivity.

TABLE IX

| Experiment number | Group of— A | B | C | D | E |
|---|---|---|---|---|---|
| 1 | 2/6 | 3/7 | 5/7 | 2/6 | 4/6 (1 sick) |
| 2 | 0/6 | 1/7 | 1/6 | 4/7 | 3/6 (3 sick) |
| 3 | | | 1/5 | 0/5 | 2/6 | 1/7 (4 sick) |
| 4 | 2/6 | 1/6 | 1/6 | | 3/6 (3 sick) |
| Total dead/total mice | 4/18 | 6/25 | 7/24 | 8/19 | 11/25 (11 sick) |
| Percent deaths | 22 | 24 | 29 | 42 | 44 |
| Percent sick | 0 | 0 | 0 | 0 | 44 |
| Percent healthy | 78 | 76 | 71 | 58 | 12 |

The above results illustrate the protective effect of FWH-775 in influenza infection in mice. A comparison of the percentage of healthy mice in each group indicates that administration of the active broth beginning three days preinfection gives the maximum protective effect, whereas administration beginning at time of infection protected only 58 percent of the test animals. The percentage of healthy animals in the test groups (58–78 percent) compares very favorably with the percentage of healthy animals in the control group (12 percent).

It was indeed a surprising discovery to find that the material of the present invention which is obtained from a species of *Aspergillus niger* is capable of protecting warm blooded animals against animal viruses.

"*Aspergillus niger*" is a broad class of saprophytic fungi molds which are world wide in distribution and which have been classified without regard to morphology or other distinguishing characteristics into the *Aspergillus niger* group because of the characteristic pigmentation of the conidial heads. The members of the class are not all alike and contrasting differences in structural detail readily distinguish species within the classification. The class encompasses *A. carbonarius* (Bain.) Thom with 301 recognized varieties and species, *A. japonicus* Saito with over 327 species, *A. aculeatus Iizuka* with 328 species and varieties. *A. niger* Van Tieghem with 309 species and varieties, *A. ficuum* with 306 speces and varieties, *A. phoenicis* (Cda) Thom 307 varieties, and so forth, to a total number of varieties and species that in all likelihood exceeds 15,000.

In all of the 17 groups classified in *Aspergillus niger* only 8 groups are known to produce anti-bacterial material and only 1 group *Aspergillus fumigatus* is known to produce antiviral substances, however, these latter antiviral substances have only been found to be effective against bacterial virus as opposed to the animal virus which is destroyed by the antiviral material of the present invention.

What is claimed is:

1. A method of producing an antiviral fermentation broth having as the antiviral component therein a substance identified as FWH–775 which comprises forming an aqueous fermentation culture medium and cultivating the strain of *Aspergillus niger* A.T.C.C. 16508 under aerobic conditions therein at a temperature of from about 20° C. to about 40° C. until substantial antiviral activity is produced by said organism in said culture medium.

2. A method substantially as described in claim 1 wherein the culture medium consists of a balanced salt solution enriched with 0.5% lactalbumin hydrolysate and 0.1% yeastolate.

3. A method substantially as described in claim 1 in which said cultivation is carried out at stationary incubation for a period of from 6 to 15 days.

4. A method substantially as described in claim 1 in which said cultivation is carried out under agitated incubation conditions for a period of from 2 to 4 days.

5. An antiviral agent identified as FWH–775, produced by a process which comprises cultivating under aerobic conditions the antiviral producing strain of *Aspergillus niger* A.T.C.C. 16508 in an aqueous culture medium at a temperature of from about 20° C. to about 40° C. until antiviral activity is produced in said culture medium.

References Cited

M. Miric: *Plant Disease Reporter*, vol. 37, No. 3, pp. 157–158 (1953).

ALVIN E. TANENHOLTZ, Primary Examiner

T. G. WISEMAN, Assistant Examiner

U.S. Cl. X.R.

195—81